United States Patent [19]
MacGugan

[11] Patent Number: 6,145,380
[45] Date of Patent: Nov. 14, 2000

[54] SILICON MICRO-MACHINED ACCELEROMETER USING INTEGRATED ELECTRICAL AND MECHANICAL PACKAGING

[75] Inventor: Douglas C. MacGugan, Bellevue, Wash.

[73] Assignee: AlliedSignal, Morristown, N.J.

[21] Appl. No.: 09/205,429

[22] Filed: Dec. 4, 1998

Related U.S. Application Data

[60] Provisional application No. 60/068,022, Dec. 18, 1997.

[51] Int. Cl.⁷ .................................................. G01P 1/02

[52] U.S. Cl. .................................. 73/493; 73/514.29

[58] Field of Search .................... 73/493, 514.12, 73/514.16, 514.21, 514.23, 514.32, 514.33, 514.34, 514.36, 514.29

[56] References Cited

U.S. PATENT DOCUMENTS

| | | | |
|---|---|---|---|
| 4,991,283 | 2/1991 | Johnson et al. | 29/595 |
| 5,433,110 | 7/1995 | Gertz et al. | 73/510 |
| 5,581,032 | 12/1996 | Uemura et al. | 73/493 |
| 5,602,421 | 2/1997 | Li | 257/728 |
| 5,650,567 | 7/1997 | Ueda et al. | 73/493 |
| 5,767,404 | 6/1998 | Kaiser et al. | 73/493 |
| 5,881,598 | 3/1999 | Sapuppo et al. | 74/5.6 E |

FOREIGN PATENT DOCUMENTS

| | | |
|---|---|---|
| 0 595 735 | of 0000 | France . |
| 195 21 712 | of 0000 | Germany . |
| 197 17 611 | of 0000 | Germany . |

Primary Examiner—Helen C. Kwok

[57] ABSTRACT

An integrated sensor package formed using low temperature co-fired ceramic assembly techniques and method for manufacturing same.

24 Claims, 6 Drawing Sheets

SILICON MICRO-MACHINED ACCELEROMETER USING INTEGRATED ELECTRICAL AND MECHANICAL PACKAGING

RELATED APPLICATIONS

This application claims priority from U.S. Provisional Application Ser. No. 60/068,022 filed Dec. 18, 1997.

BACKGROUND OF THE INVENTION

The invention relates to micro-machined silicon accelerometers and in particular, to mechanical packaging and electrical signal routing.

The oil and gas well drilling and survey fields as well as many other fields of industry require low cost, highly accurate and highly reliable measuring instruments and sensors. Measuring instruments and sensors used in the oil and gas well drilling and survey fields and many other industries, for example, aircraft equipment and military ordinance, must survive and operate accurately in extreme environmental conditions including, for example, extreme vibrations and impacts experienced at temperatures ranging from well below freezing to hundreds of degrees Centigrade. In these applications, measuring instruments and sensors are often tested for operation in random vibration environments as extreme as 20 g RMS to 1,000 Hz and sine vibration environments as extreme as 30 g peak; shock or impact environments in the range of 1,000 g's while surviving shocks of as much as 2,000 g's; and temperature extremes ranging from −40 to +200 degrees Centigrade.

In the oil and gas industry, sensor packaging and environmental needs have become even more severe as deposits are sought in ever deeper boreholes. The deeper the borehole the more extreme the temperature in which the drill string and drill string steering tools must operate. Boreholes frequently also contain changes in direction at various points along its depth. The deep and angular boreholes often require the measuring instrument or sensor guiding the drill string to operate in very small spaces which may be one inch or less in diameter. Current directional instruments are too large and temperature limited to operate effectively in these applications. For example, current instruments are typically 1¼ to 1½ inch in diameter and are typically limited to operate in temperature environments of +150 degrees Centigrade or less.

Well drilling and logging operations typically require that very expensive equipment and highly skilled workers operate in remote locations. This combination of factors results in operating costs that may run half a million dollars or more per day. Thus, an equipment failure which forces operations to shut-down may be very costly. To limit the costs associated with equipment failures, many operators keep spare parts on hand, including spare measuring instruments and sensors, even though the spare parts may be very expensive themselves. Such costly operations in such extreme environmental conditions demand sensors and measuring instruments which are compact, very rugged and highly reliable.

In order to survive and operate in such hostile environments while meeting the needs imposed by the various drilling, survey and industrial applications, manufacturers of high accuracy measuring instruments and sensors have employed various packaging methods to protect the sensor. High accuracy sensor packaging methods include packaging the sensor element within a housing and sealing the housing with a header having interconnect pins for inputting power and drive signals and outputting sensor signals. The housing consists of a metal container, for example, a deep drawn metal can or machined metal housing. The header, also manufactured of metal, uses metal interconnect pins to provide power and signal routing interfaces. The interconnect pins are typically sealed in the header using conventional glass sealing technology.

Besides the extreme vibration and shock environments, the external temperature in which the instrument must operate may adversely impact the operation of the internal sensor. For example, the difference in temperature expansion between the silicon sensor element and the metal housing/header arrangement introduces strain at the mounting interface and may result in measurement errors. Many exotic methods have been used in attempts to prevent external environmental factors from disturbing or interfering with the operation of the internal sensor. However, use of instruments in these environmentally hostile environments nonetheless remains temperature limited.

SUMMARY OF THE INVENTION

In the described environmentally demanding applications, silicon micro-machined sensors offer several advantages including small size, ease of fabrication, and inherent reliability.

The present invention resolves significant problems of the prior art by providing an inherently rugged high accuracy sensor package which allows all of the advantages of micro-machined sensors to be realized and a method for producing such an inherently rugged high accuracy sensor package. The present invention provides a directional indication instrument measuring significantly less than one inch in diameter and capable of operation at temperatures in the range of −40 to 200 degrees Centigrade while providing the same or better performance compared with current larger measuring instruments operating in similar applications and similar environmental shock and vibration regimes. The present invention provides an inherently rugged package and packaging method which avoids the pitfalls of current instrument packages and packaging techniques by integrating mechanical packaging with electrical signal routing.

The present invention provides a mechanical package combined with the electrical power and signal routing by using thin film technology. According to one aspect of the present invention, thin film processing places power and signal routing on one or more layers of ceramic substrates. Metalized electrical vias are used to route signals between individual layers of ceramic substrates. The individual ceramic substrate layers are then aligned, stacked together, pressed and co-fired to make an integral, ceramic package. The ceramic package provides a mounting surface for the silicon sensor, wire bond pads for integrating the sensor electrically, and external bond pads for providing input power and output signal interfaces.

The integral ceramic package provides a package which minimizes thermally induced strain errors by providing a thermal environment similar to the silicon sensor. Ceramic exhibits a coefficient of thermal expansion very similar to that of silicon. Thus, thermally induced strain errors due to mismatch between thermal expansion rates of the different materials are minimized. The mechanical package is easily sealed using standard lid sealing techniques used widely in the industry, for example, epoxy sealing, soldering, or laser or electron beam welding.

According to another aspect of the present invention, the active electronics which drive the silicon sensor and sense the sensor signals are integrated directly onto the ceramic substrate layers. This integration of the active electronics is accomplished either by integrating the circuit layers into the separate ceramic layers or by using conventional thick film processing on the ceramic substrate. Integration of the active electronics by integrating the circuit layers into the separate ceramic layers provides increased circuit density which in turn provides smaller overall instrument package size.

The ceramic package of the present invention is not limited to the production of accurate, rugged, highly reliable accelerometers. For example, the ceramic package of the present invention is similarly applicable to pressure sensors as well as other micro-machined silicon measuring devices, particularly for those sensors used in environmentally challenging applications.

The present invention may be realized in various embodiments, several of which are described herein.

DETAILED DESCRIPTION OF THE PREFERRED EMBODIMENT(S)

According to one aspect of the present invention, a method of fabricating a high accuracy, rugged instrument, including an accelerometer, integrating the mechanical packaging with the electrical input power and output signal routing and external interfaces is provided.

According to one embodiment, the present invention uses a process known in the art as low temperature co-fired ceramic (LTCC) assembly to assemble an instrument package. LTCC assembly is a process used to fabricate multilayer ceramic hybrid substrates such as, for example, multichip modules.

Figures 1, 2:
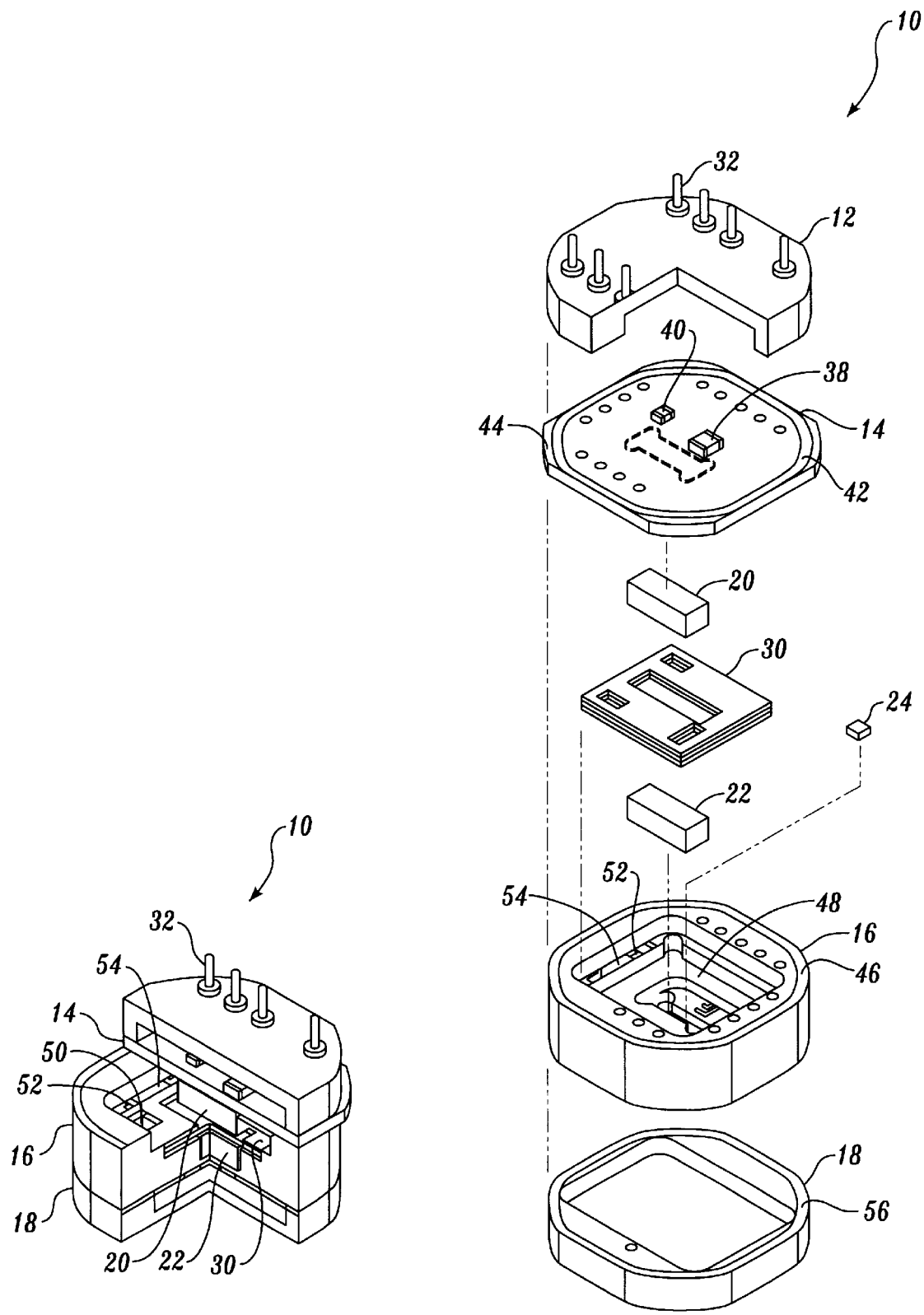
FIG. 1 is a cut-away view of an accelerometer package according to one embodiment of the present invention.
FIG. 2 is an exploded view of the accelerometer package of FIG. 1.

FIG. 1 illustrates one embodiment of the present invention realized using LTCC packaging to fabricate a small size, rugged, micro-machined silicon accelerometer. FIG. 1 shows a header-up cut-away view of the accelerometer package 10. The accelerometer described in FIG. 1 is less than one inch in diameter when fully packaged and performs acceptably when subjected to the following environments: random vibration applied at 120 g's RMS from 120 Hz to 1,000 Hz; sine vibration applied at 30 g's, peak; shocks applied at 1,000 g's during operation and shocks applied at 2,000 g's for survivability; and temperature extremes from −40 to 200 degrees Centigrade.

FIG. 2 shows an exploded view of accelerometer package 10 according to one embodiment of the present invention.

According to the embodiment shown in FIG. 2, accelerometer package 10 consists of four LTCC members: a combination header and upper hybrid cover 12; a combination upper hybrid and mount flange 14; a combination die carrier and lower hybrid 16; and a lower hybrid cover 18. Additional components beyond the scope of this invention, for example magnets 20, 22, a temperature sensor 24, an acceleration sensor 30, and a housing (not shown) are included to enable a working accelerometer. The general assembly of these components is shown in FIG. 1. For examples of micro-machined acceleration sensors generally see U.S. Pat. Nos. 4,766,768 and 5,241,861, both incorporated herein by reference.

Figure 3:
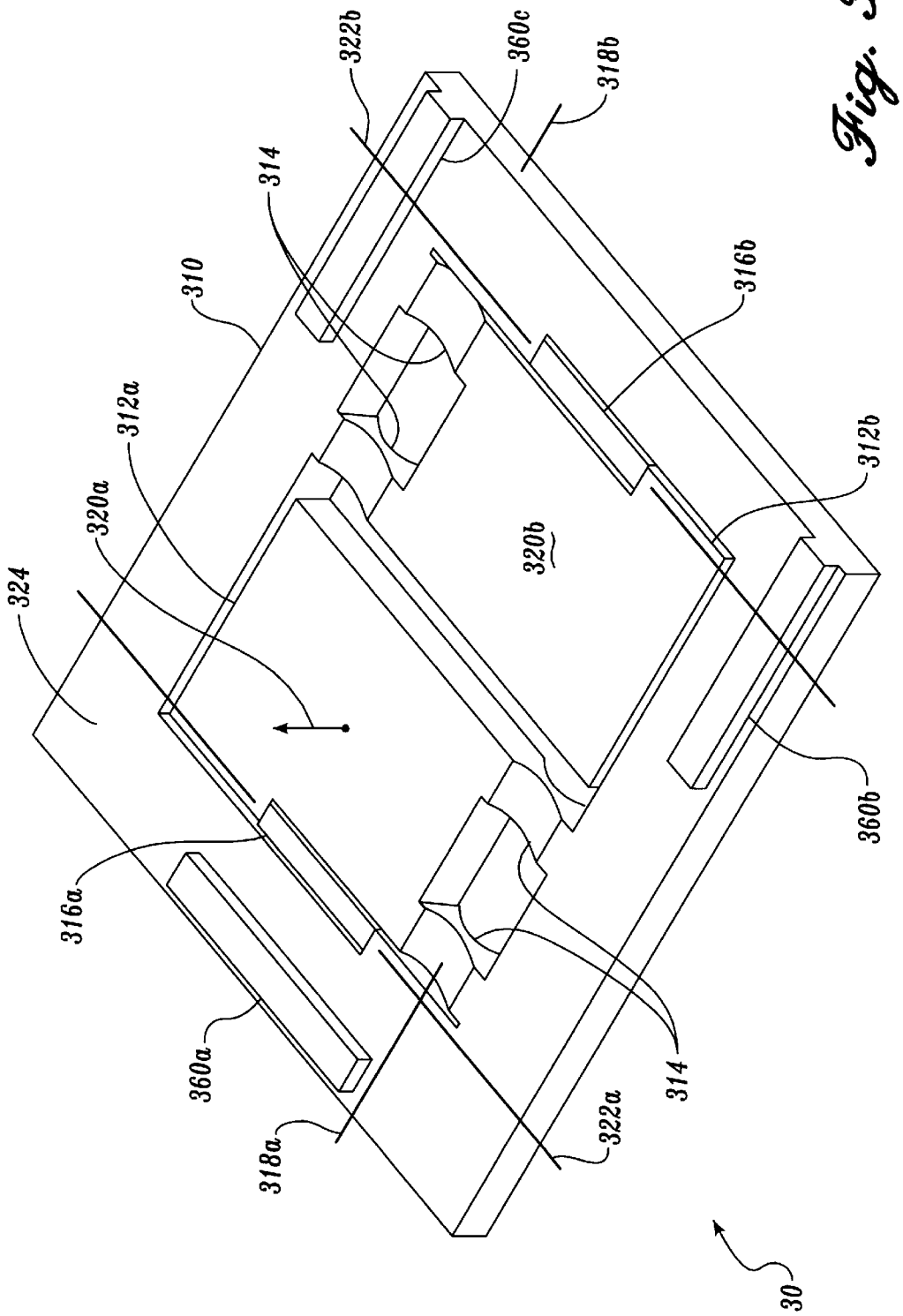
FIG. 3 illustrates by example a silicon acceleration sensing mechanism, including a description of the location of the acceleration sensor mounting pads according to one embodiment of the present invention.

According to one embodiment of the present invention, acceleration sensor 30 may configured as shown in FIG. 3. FIG. 3 illustrates by example double-ended tuning fork (DETF) transducer-based acceleration sensor 30. A typical DETF transducer-based acceleration sensing mechanism comprises a frame 310 formed of a suitable substrate material, for example, silicon or quartz. A reaction mass or proof mass 312a is rotatably suspended from frame 310 by one or more hinges 314. Force sensing transducer 316a is suspended between frame 310 and reaction mass 312a. Frame 310 is mounted in a shaped cavity 48 in combination die carrier and lower hybrid 16 shown in FIG. 2 such that reaction mass 312a has limited space to rotate about hinge axis 318a in response to a force input along input axis 320a normal to the plane of reaction mass 312a. As reaction mass 312a rotates relative to frame 310 in response to a force experienced along input axis 320a, force sensing transducer 316a experiences either a compressive or tensile force along its longitudinal axis 322a. In other words, force sensing transducer 316a is either compressed or stretched between frame 310 and reaction mass 312a when reaction mass 312a is displaced or rotated away from a null position relative to frame 310.

Two force sensing transducers 316a may be used with reaction mass 312a in order to reduce or eliminate common mode effects. When two force sensing transducers 316a are used, the two transducers are mounted such that displacement or rotation of reaction mass 312a places a first transducer into compression while placing the second transducer into tension. For example, when a first force sensing transducer 316a is mounted on a first surface 324 of frame 310, a second force sensing transducer (not shown) may be mounted on the opposite surface of frame 310. Other configurations wherein a first and second force sensing transducer are mounted such that displacement or rotation of reaction mass 312a places the first transducer into compression and places the second transducer into tension are known to those of skill in the art. For example, several alternate configurations are described in U.S. Pat. No. 5,005,413, which is incorporated herein by reference.

Micro-machined silicon acceleration sensor 30 provides an acceleration signal output as a variable frequency having a change from a nominal resonance proportional to the sensed acceleration. In other words, when reaction mass 312a of FIG. 3 are displaced or rotated relative to frame 310 in response to an acceleration input, force sensing transducer 316a is placed into either compression or tension. The natural frequency of force sensing transducer 316a changes when force sensing transducer 316a is compressed or stretched: the natural frequency of force sensing transducer 316a decreases below a nominal resonance when transducer 316a is compressed and increases above a nominal resonance when transducers 316a is stretched. The resulting change in frequency is proportional to the force or acceleration applied to reaction mass 312a. This push/pull phenomenon is extensively described in U.S. Pat. No. 5,005,413.

Although described above in the singular for clarity, acceleration sensor 30 may comprise two independent reaction masses 312a, 312b rotatably mounted from frame 310. Each reaction mass 312a, 312b rotates independently about its own hinge axis 318a, 318b in response to an force input along its own input axis 320a, 320b and each transducer 316a, 316b is compressed or stretched independently of the other.

Figure 4:
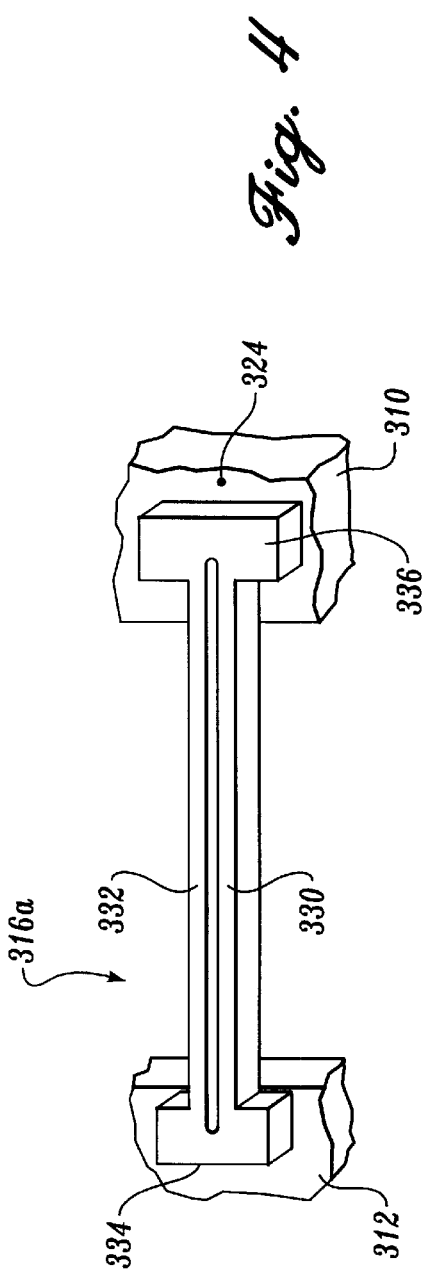
FIG. 4 illustrates by example a two tine vibrating beam force sensing transducer.

FIG. 4 is a detailed example of two tine vibrating beam force sensing transducer 316a. Micro-machined silicon acceleration sensor 30 may employ vibrating beam force sensing transducers of, for example, the general configuration shown in FIG. 4. Transducer 316a comprises two tines 330, 332 attached to mounting tabs 334, 336. Tines 330, 332 are adapted to vibrate or oscillate at their respective natural frequencies in response to a drive signal applied by a drive circuit.

Figure 5:
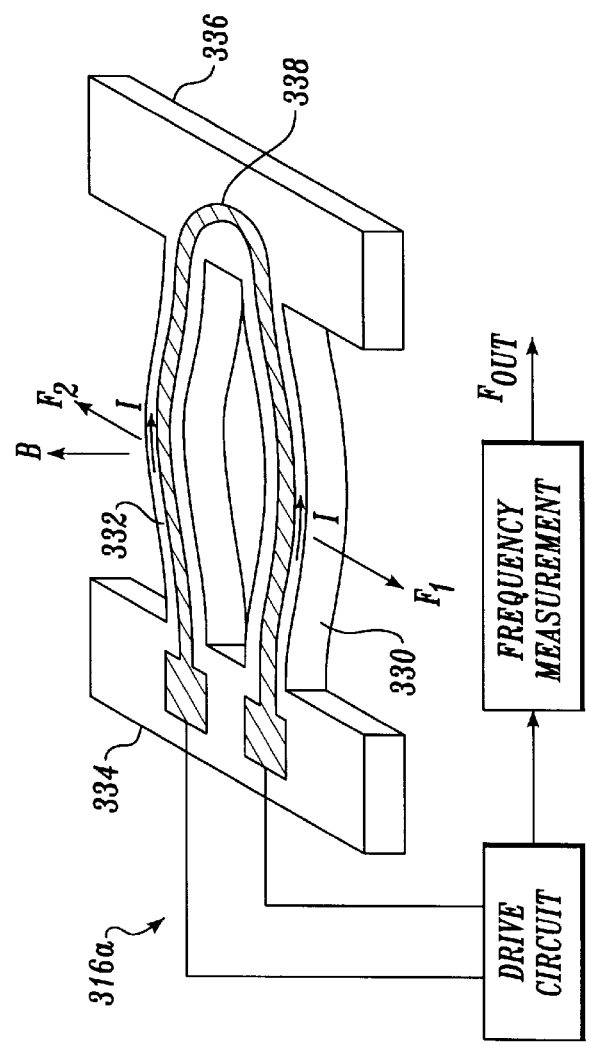
FIG. 5 illustrates the mechanical operation of a two tine vibrating beam force sensing transducer.

FIG. 5 illustrates the mechanical operation of transducer 316a. Various methods of inducing oscillation in tines 330, 332 are known. For example, tines 330, 332 may be adapted to accept an electrical current by forming tines 330, 332 in a semiconducting material, for example, doped conductive polysilicon. In another example, electrically conductive film electrode 338 may be deposited on a surface of tines 330, 332 as shown in FIG. 5. Vibration or oscillation of tines 330, 332 may be accomplished by various means. For example, in a typical magnetic drive sensor, tines 330, 332 are mounted within the field, B, of one or more permanent magnets 20, 22. A drive circuit applies an oscillating or alternating current, I, in electrically conductive film electrode 338 which induces a sympathetic alternating magnetic field within conductive film electrode 338. The alternating or oscillating current-induced magnetic field in conductive film electrode 338 interacts with the field, B, of the permanent magnets to create forces, $F_1$ and $F_2$, which drive tines 330, 332 into oscillation. In an alternate configuration (not shown), force sensing transducer 316a may be manufactured having four tines. In a four tine transducer, the sensing circuit may comprise two pair of driven and sensed tines, each pair comprising an inner tine and an outer tine as described in U.S. Pat. Nos. 5,367,217 and 5,331,242, both incorporated herein by reference.

Figure 6:
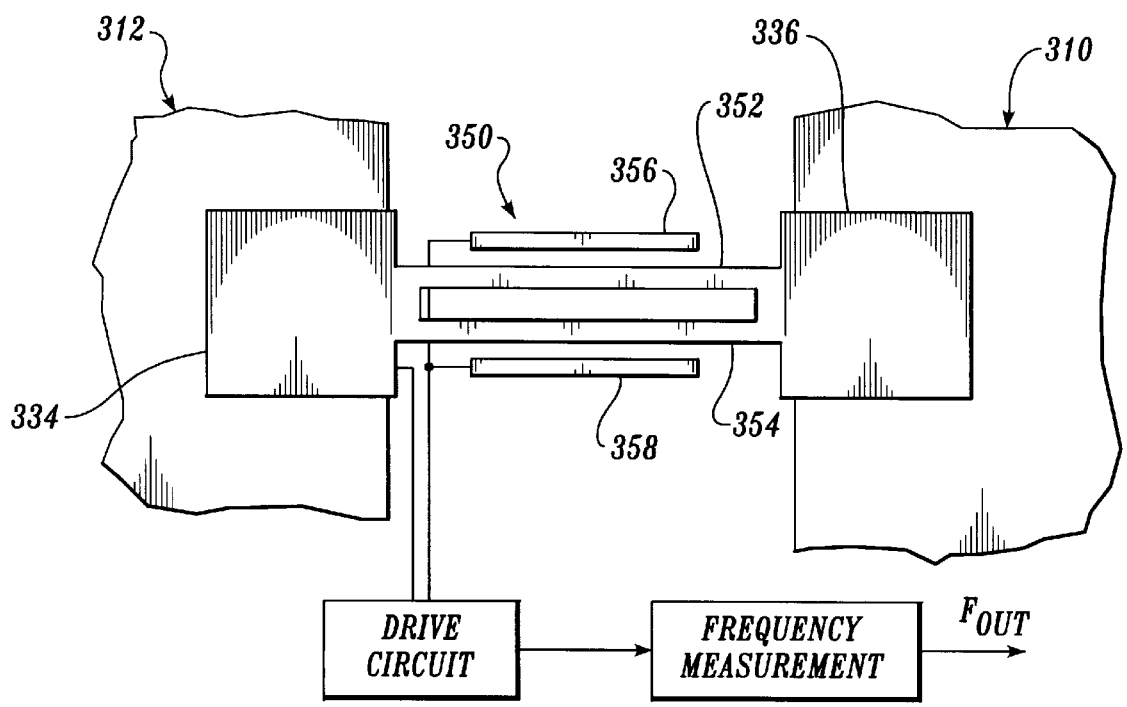
FIG. 6 illustrates an electrostatic drive vibratory accelerometer system.

Alternatively, the invention may be practiced using an electrostatic or capacitive drive vibratory system 350 as illustrated in FIG. 6. In the embodiment of FIG. 6, tine oscillation may be driven by inducing alternating or oscillating electrostatic forces between electrically conductive surfaces on tines 352, 354 and adjacent conductors 356, 358 mounted on frame 310 adjacent to and coextensive with conductive surfaces on tines 352, 354. Electrostatically driven dual vibrating beam force transducers are known in the art and are disclosed in U.S. Pat. Nos. 4,901,586 and 5,456,111 and co-pending U.S. patent application Ser. No. 08/651,927 entitled "Electrostatic Drive For Accelerometer" filed May 21, 1996, and commonly assigned to the assignee of the present application, all incorporated herein by reference. Other examples of micro-machined silicon acceleration sensors which may be used with the present invention are described in U.S. Pat. Nos. 4,766,768 and 5,241,861, both incorporated herein by reference.

DETF transducer 316 may be constructed using methods described in co-pending U.S. patent application Ser. No. 08/735,299 "Vibrating Beam Accelerometer And Method For Manufacturing The Same" filed Oct. 22, 1996, which is similarly assigned to the assignee of the present patent application and incorporated herein by reference. Optionally, the DETF transducers may be constructed using any of the designs known to those of skill in the art. For example, classical formulae for designing DETFs are described in U.S. Pat. No. 4,372,173 and finite element analysis techniques for designing DETFs are described in U.S. Pat. No. 5,668,329, both incorporated herein by reference.

All four LTCC packages, combination header and upper hybrid cover 12; combination upper hybrid and mount flange 14; combination die carrier and lower hybrid 16; and lower hybrid cover 18, integrate electrical signal routing through the various ceramic layers making up each individual piece. Each individual piece provides a mechanically robust method of securing the entire accelerometer sensor 10. The particular embodiment of the present invention shown in FIG. 2 illustrates how a dual vibrating beam or double-ended tuning fork micro-machined silicon acceleration sensor is implemented using techniques of this invention. For example, packaging of a typical micro-machined double-ended tuning fork acceleration sensor 30 is shown in FIG. 2. Other sensor approaches, including, for example, alternative acceleration sensors or pressure sensors, may include more or less individual LTCC pieces to implement a reliable instrument package, but the overall process is consistent with the following detailed description.

According to one embodiment of the present invention, combination header and upper hybrid cover 12 provides two functions. Combination header and upper hybrid cover 12 provides an interface to the external environment through an interface, for example, pins 32. Pins 32 are electrically connected through the ceramic tape substrates of upper hybrid cover 12 to the lower bond pads 34, also known as catch pads, of the ceramic package. These catch pads provide electrical contact between interconnect pins 32 and the mating ceramic piece, upper hybrid 14 using conventional re-flow techniques widely known and used in the integrated circuit industry.

Combination header and upper hybrid cover 12 provides a second function. Combination header and upper hybrid cover 12 provides a cover for the electrical components 38, 40 of upper hybrid 14. In the embodiment of FIG. 2, a first electrical circuit drives silicon micro-machined vibrating beam acceleration sensor 30 and a second separate electrical circuit senses vibrating beam acceleration sensor 30. Additionally, header and upper cover 12 includes a seal ring (not shown) whereby combination header and upper hybrid cover 12 is hermetically sealed to combination upper hybrid and mount flange 14 via a mating seal ring 42. The hermetic seal is obtained using conventional re-flow lid sealing techniques widely known and used in the integrated circuit industry.

According to one embodiment of the present invention, combination upper hybrid and mount flange 14 provides two functions. Upper hybrid 14 provides the electrical circuit function of one section of vibrating beam acceleration sensor 30. Upper hybrid 14 includes a circuit function which provides resonance operation, drive and sense, of one of the two DETF transducers. The circuit comprises power conditioning, oscillator drive and DETF transducer sensing functions. Combination die carrier and lower hybrid 16 includes a duplicate circuit which provides the same function for the second DETF transducer. Although the two functions may be separated for compactness, those of skill in the art will recognize that the functions of the first and second circuit may be combined into a single circuit substrate.

The present invention utilizes micro-electronics to improve the reliability of the sensor system's electronic features. For example, the power conditioning, oscillator drive and DETF transducer sensing functions of upper hybrid 14 and combination die carrier and lower hybrid 16 are implemented in first and second hybrid electronics packages. Hybridization of complex circuits provides higher component density by "stacking" the conductive traces, which carry signals between the various components, vertically on separate layers such that traces can cross one another and can be routed under circuit components without interference or "cross talk."

Figure 8:
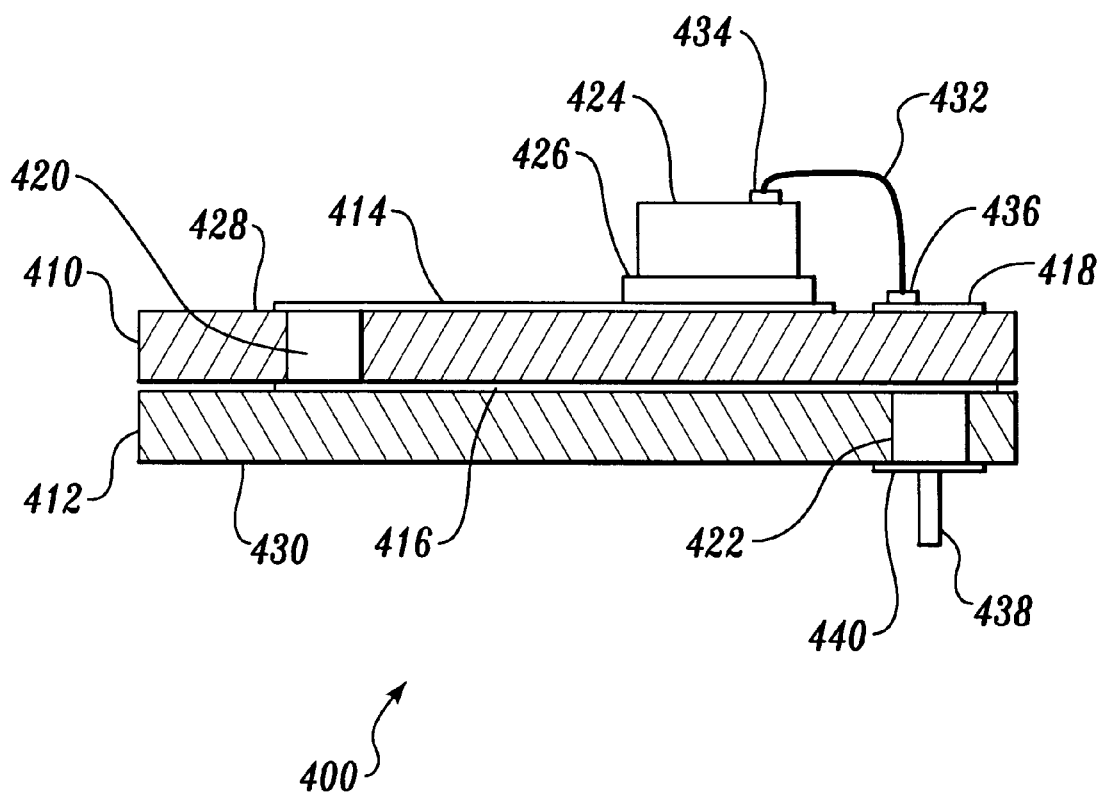
FIG. 8 illustrates an example of a two layer hybrid electronics package or multichip module.

FIG. 8 illustrates an example of a two layer hybrid electronics package or multichip module. Those of skill in the art will appreciate that in practice a hybrid electronics package may be implemented in as many as 30 or more layers depending on the complexity of the circuit. The hybrid electronics package 400 of FIG. 8 comprises, for example, substrates 410 and 412 which may be formed of any suitable material, for example, ceramic. Traces 414, 416, 418 are silk screened onto each surface of substrates 410, 412 in a pattern which routes signals according to the circuit design. Traces 414, 416 are formed using a paste formed of a suitable conductive material, for example, gold. Holes or "vias" 420, 422 punched in substrates 410, 412 are filled with the conductive paste to electrically connect trace 414 on a first layer formed by substrate 410 to trace 416 on a second layer formed by substrate 412. After silk screening, substrates 410, 412 are vertically stacked with traces 414, 416, 418 and vias 420, 422 aligned and the stack is baked or "fired" to form an essentially solid block of substrate material interleaved with conductive traces.

Components or die 424, each mounted on its own solder pad 426, are mounted on one or more surfaces 428, 430. Components 424 are accessed by bonding conductors 432, for example, gold wires, between wire bond pads 434 on component 424 and wire bond pads 436 on substrate 410. One or more pins 438, each mounted on its own solder pad 440, are mounted on one or more surfaces 428, 430. Pins 432 provide for signal input and output for the resulting hybrid circuit 400.

In the embodiment of FIG. 2, the circuit functions are implemented using high density thin film metalization on three ceramic layers. Electrical vias provide inter-layer connection to the circuit as well as power and signal routing to and from acceleration sensor 30. Alternatively, the electrical circuit function may be fabricated exclusively on the outer most ceramic layer using conventional thick film hybrid techniques.

Combination upper hybrid and mount flange 14 additionally provides mechanical means for transferring the alignment of acceleration sensor 30 to an external mounting system. Alignment transference is accomplished by using conventional integrated circuit design techniques to design the ceramic layout such that the mount flange portion 44 of combination upper hybrid and mount flange 14 extends to the exterior of seal ring 42. The resulting hermetic seal between combination upper hybrid and mount flange 14 and combination die carrier and lower hybrid 16 is not interrupted when flange portion 44 is external to seal ring 42.

Combination die carrier and lower hybrid 16 provides the second electrical circuit function for the second DETF transducer of vibrating beam acceleration sensor 30. The second electrical circuit function is similar to the first electrical circuit function provided by upper hybrid 14 and may be implemented in any of the alternative thin film or thick film hybrid techniques described earlier. Combination die carrier and lower hybrid 16 further provides mechanical and electrical interface for mounting silicon acceleration sensor die 30. According to the embodiment illustrated in FIG. 2, separate solid state thermal sensor 24 is integrated into combination die carrier and lower hybrid 16. Combination die carrier and lower hybrid 16 is hermetically sealed to combination upper hybrid and mount flange 14. Seal ring 46 provides the hermetic seal using conventional re-flow lid sealing techniques widely known and used in the integrated circuit industry.

Figure 7:
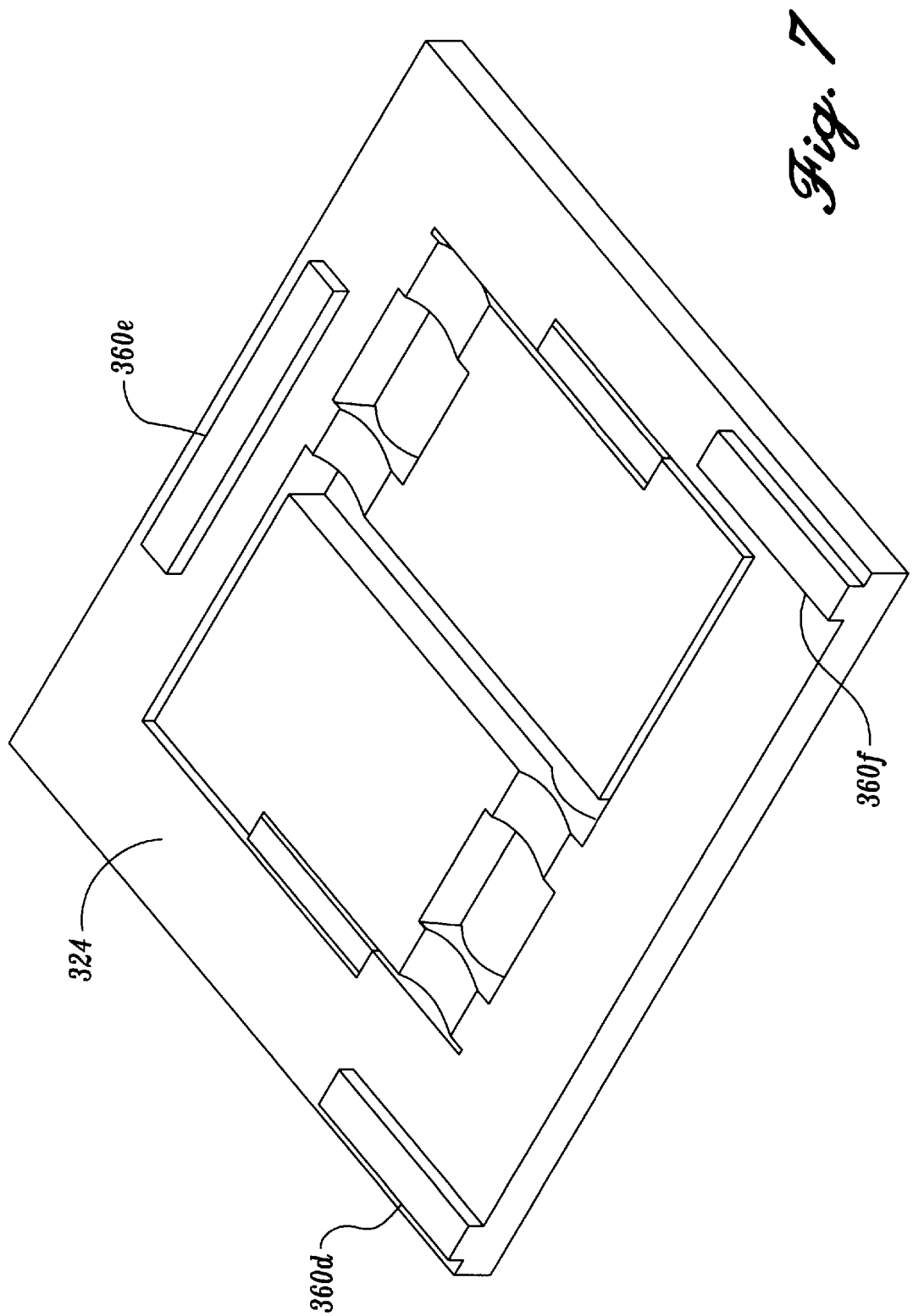
FIG. 7 illustrates the location of the acceleration sensor mounting pads according to one alternative embodiment of the invention.

Mechanical attachment of silicon acceleration sensor 30 is provided through design of three ceramic attachment surfaces integral within the ceramic layers of the die carrier portion of combination die carrier and lower hybrid 16. Silicon acceleration sensor 30 mounts on three ceramic mounting pads 360a, 360b, 360c which provide a level, inherently planar reference surface for aligning acceleration sensor 30 and minimizing mounting stresses. FIG. 7 shows an alternative embodiment of the invention wherein mounting pads 360d, 360e, 360f are rotated 90 degrees from the configuration illustrated in FIG. 3. Mounting pads 360 are formed in surface 324 of sensor 30 such that, when sensor 30 is mounted in shaped cavity 48 in combination die carrier and lower hybrid 16 of FIG. 2, all electrical interfaces to sensor 30, for example, wire bonds 50, are led to wire bond pads 52 on a ceramic shelf 54 surrounding cavity 48. Ceramic shelf 54 is essentially coplanar with the surface of sensor 30. The co-planarity of sensor 30 and adjacent shelf 54 provides for minimum length wire bonds 50 which enhances robustness, producibility, and reliability by providing short, low mass, easily separated interconnect wires.

One benefit of using ceramic mounting pads for attachment of acceleration sensor 30 is that ceramic has a coefficient of thermal expansion closely matching that of silicon. Ceramic also provides a stable mechanical surface over thermal changes, mechanical vibrations and mechanical shocks. Thus, mounting acceleration sensor 30 to attachment surfaces within the ceramic layers according to the method of the present invention essentially eliminates thermally or mechanically induced strain in silicon acceleration sensor 30 which improves performance during exposure to hostile environments, increases long term response stability, and enhances environmental survival characteristics.

The fourth part of accelerometer package 10 according to the example embodiment illustrated in FIG. 2 is lower hybrid cover 18. Lower hybrid cover 18 provides both a cover and a hermetic seal for combination die carrier and lower hybrid 16. The hermetic seal is provided by seal ring 56 using conventional re-flow lid sealing techniques.

Alternate Embodiments

The present invention may be practiced using aluminum oxide, also known as alumina, with a glass binder which makes the alumina compatible with the low temperature LTCC process.

Alternative embodiments of the present invention include using various ceramic materials other than alumina for tape layer build-up, including, for example, aluminum nitride or various grades of alumina including silicon oxide, silicon carbide, silicon nitride and zirconia. Aluminum nitride has a coefficient of thermal expansion in the range of 4.7 to 5.0 ppm/degree Centigrade which nearly matches that of silicon which is approximately 2.6 ppm/degree Centigrade. By comparison, alumina has a relatively higher coefficient of thermal expansion in the range of 6.7 to 7.5 ppm/degree Centigrade. Aluminum nitride also has a very high coefficient of thermal conductivity relative to other ceramics. For example, aluminum nitride has a coefficient of thermal conductivity in the range of 180 to 200 watts/meter/degree Centigrade compared with 3 to 4 watts/meter/degree Centigrade for alumina. Additionally, aluminum nitride laminates are less brittle than alumina laminates. Aluminum nitride is generally more expensive than other ceramics and the processes to use thin aluminum nitride laminates is not well established at this time.

Another category of alternative materials is fiberglass reinforced plastic (FRP) laminates. FRP laminates are often used for printed circuit boards and include the high temperature polyimide based plastics. FRP laminates generally have a higher coefficient of thermal expansion than ceramics and are less rigid than ceramics. However, FRP laminates are generally lower cost than ceramics. Thus, FRP laminates are a practical alternative to ceramic for some applications using the present invention, for example, some commercial grade pressure sensor and accelerometer applications.

Alternatively, electrical circuitry may be incorporated into the inner cover substrate surface of lower hybrid cover 18 or upper hybrid cover 12. Electrical circuits to drive and/or sense alternative sensors, for example, pressure sensors or alternative designs of acceleration sensors, may be added or substituted. The present invention is not limited to either acceleration sensors or pressure sensors. Various sensors may be substituted, for example, other types of inertial sensors including angular rate sensors or gyroscopes, chemical sensors, or magnetic field sensors.

Within the limitation of applying the present packaging invention to accelerometers, one or more of the ceramic LTCC pieces may be deleted and its function incorporated into another of the remaining pieces or its function may be eliminated or so modified that use of one or more of the LTCC pieces is obviated. Application of the present packaging invention to alternative sensors may allow elimination of one or more of the LTCC pieces.

Alternative methods for providing electrical continuity between LTCC pieces include the use of conductive epoxies or thermoplastics, various solder alloys or elastomeric conductive pads. Alternative methods for sealing LTCC pieces include the use of re-flow solder using various solder alloys and conductive or non-conductive epoxies or thermoplastics. The present packaging invention may be embodied using alternative shapes and configurations different from those disclosed herein.

Preferred embodiments of the invention have been described, including various alternative embodiments. Additional variations and modifications will be readily apparent to those of skill in the art.

What is claimed is:

1. A sensor package comprising:
   plurality of multi-layer hybrid substrates;
   a measuring device mounted on one of said substrates;
   a circuit integrated onto one of said multi-layer hybrid substrates for driving and sensing said measuring device;
   a housing formed of said substrates enclosing said measuring device and said driving and sensing circuit; and
   an interface for inputting power and drive signals and outputting measuring device signals.

2. The sensor package recited in claim 1 wherein said substrates and said measuring device comprise a multichip module.

3. The sensor package recited in claim 2 wherein said multichip module is assembled using low temperature co-fired ceramic (LTCC) assembly techniques.

4. The sensor package recited in claim 3 wherein said measuring device is an acceleration sensor.

5. The sensor package recited in claim 4 wherein said acceleration sensor is a micro-machined silicon sensor.

6. The sensor package recited in claim 1 wherein at least one of said multi-layer hybrid substrates comprises a plurality of separate layers and said circuit is integrated into said layers of said substrate.

7. The sensor package recited in claim 6 wherein said circuit is formed on said substrate using thick film processing.

8. The sensor package recited in claim 1 wherein said substrates have a first coefficient of thermal expansion and said measuring device has a second coefficient of thermal expansion substantially equal to said first coefficient of thermal expansion.

9. The sensor package recited in claim 1 wherein said substrates are formed of a material selected from the group consisting of ceramic and fiberglass reinforced plastic.

10. A sensor package comprising:
    a plurality of multi-layer low temperature co-fired ceramic hybrid substrates including electrical circuits for routing electrical power and signals;
    a measuring device mounted on a first one of said substrates;
    a circuit integrated into a second one of said substrates for driving and sensing said measuring device;
    a housing formed of a third and fourth one of said substrates enclosing said measuring device and said driving and sensing circuit; and
    an interface integrated into one of said substrates for inputting power and drive signals and outputting signals from said measuring device.

11. The sensor package recited in claim 10 wherein said plurality of multi-layer hybrid substrates comprises:
    an upper hybrid cover;
    an upper hybrid;
    a lower hybrid; and
    a lower hybrid cover.

12. The sensor package recited in claim 11 wherein at least one of said substrates includes integrated electrical signal routing.

13. The sensor package recited in claim 12 wherein said upper hybrid cover includes a header.

14. The sensor package recited in claim 12 wherein said upper hybrid includes a mounting flange.

15. The sensor package recited in claim 12 wherein said lower hybrid includes means for mounting said measuring device.

16. A sensor package comprising:
    a plurality of multi-layer low temperature co-fired ceramic hybrid substrates including electrical circuits for routing electrical power and signals, said plurality of substrates including:
    an upper hybrid cover,
    an upper hybrid,
    a lower hybrid, and
    a lower hybrid cover;
    a measuring device mounted on one of said substrates;
    a circuit integrated into one of said substrates for driving and sensing said measuring device;

a housing formed of at least two of said substrates enclosing said measuring device and said driving and sensing circuit; and an interface integrated into one of said hybrid covers for inputting power and drive signals and outputting signals from said measuring device.

17. The sensor package recited in claim 16 wherein said substrates and said measuring device comprise a multichip module.

18. The sensor package recited in claim 17 wherein said multichip module is assembled using low temperature co-fired ceramic (LTCC) assembly techniques.

19. The sensor package recited in claim 18 wherein said measuring device is an acceleration sensor.

20. An accelerometer package comprising:

a plurality of multi-layer low temperature co-fired ceramic hybrid substrates including electrical circuits for routing electrical power and signals;

an acceleration sensor mounted on one of said substrates;

a circuit integrated into one of said substrates for driving and sensing said acceleration sensor;

a housing formed of at least two of said substrates enclosing said acceleration sensor and said driving and sensing circuit; and means integrated into one of said substrates for inputting power and drive signals and outputting signals from said acceleration sensor.

21. A method of packaging a sensor comprising the steps of:

a) forming a die carrier and a circuit on a substrate layer for mounting of a measuring device:

b) forming a circuit on a substrate layer for driving and sensing said measuring device;

c) forming an interface on a substrate layer for inputting power and drive signals and outputting measuring device signals;

d) forming a housing on a substrate layer for said measuring device and said circuit;

e) pressing and low temperature co-firing said substrate layers to form components of a sensor package;

f) aligning and stacking together said substrate layers; and g) affixing together said aligned and stacked together substrate layers to form said sensor package.

22. The method recited in claim 21 wherein said step of pressing and co-firing said aligned and stacked together substrate layers to form a sensor package defines a method of low temperature co-fired ceramic (LTCC) assembly.

23. The sensor package recited in claim 1 wherein said sensor package is assembled using conventional re-flow lid sealing techniques.

24. The sensor package recited in claim 16 wherein said sensor package is assembled using conventional re-flow lid sealing techniques.

* * * * *